United States Patent [19]
Light

[11] 3,780,863
[45] Dec. 25, 1973

[54] LIQUID FILTER
[75] Inventor: Douglas J. N. Light, Toronto, Ontario, Canada
[73] Assignee: Pollution Control Systems (International) Limited, Thornhill, Ontario, Canada
[22] Filed: July 10, 1972
[21] Appl. No.: 270,491

[30] Foreign Application Priority Data
Apr. 28, 1972 Canada .................................. 140807

[52] U.S. Cl. ..................... 210/97, 210/387, 210/403
[51] Int. Cl. ...................... B01d 33/18, B01d 33/04
[58] Field of Search ................. 210/97, 359, 386, 210/387, 399, 402, 403

[56] References Cited
UNITED STATES PATENTS
3,275,150  9/1966  Tait .............................. 210/386 X
3,169,922  2/1965  Hornbostel .................... 210/387
1,669,718  5/1928  Manning ........................ 210/387

FOREIGN PATENTS OR APPLICATIONS
503,081  11/1952  Canada ............................. 210/387

*Primary Examiner*—Samih N. Zaharna
*Assistant Examiner*—T. A. Granger
*Attorney*—Rogers, Bereskin & Parr

[57] ABSTRACT

Liquid filtration apparatus has a drum mounted for rotation about a horizontal axis. A filter material is fed in the direction of rotation of the drum onto a lowermost region of the interior of the drum, and liquid to be filtered is discharged onto the filter material in this region. The filtered liquid is discharged from the drum through a slot extending around the wall of the drum, the inner surface of the wall being of concave cross-section and a heater dehumdifies the used filter material before it is wound up on a take-up roll within the drum.

14 Claims, 4 Drawing Figures

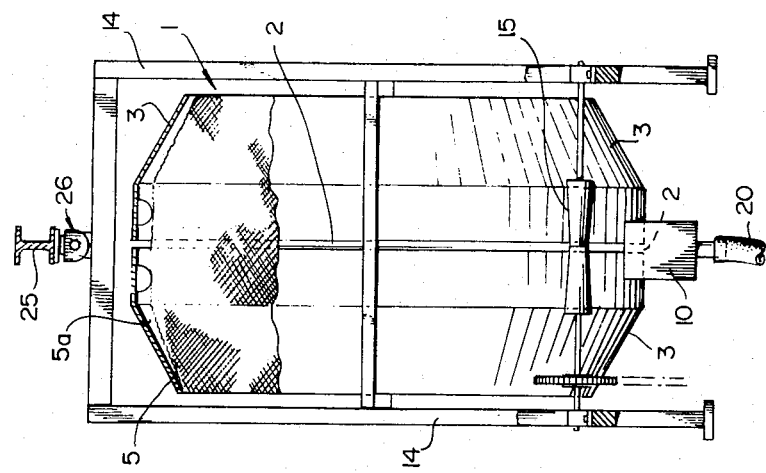
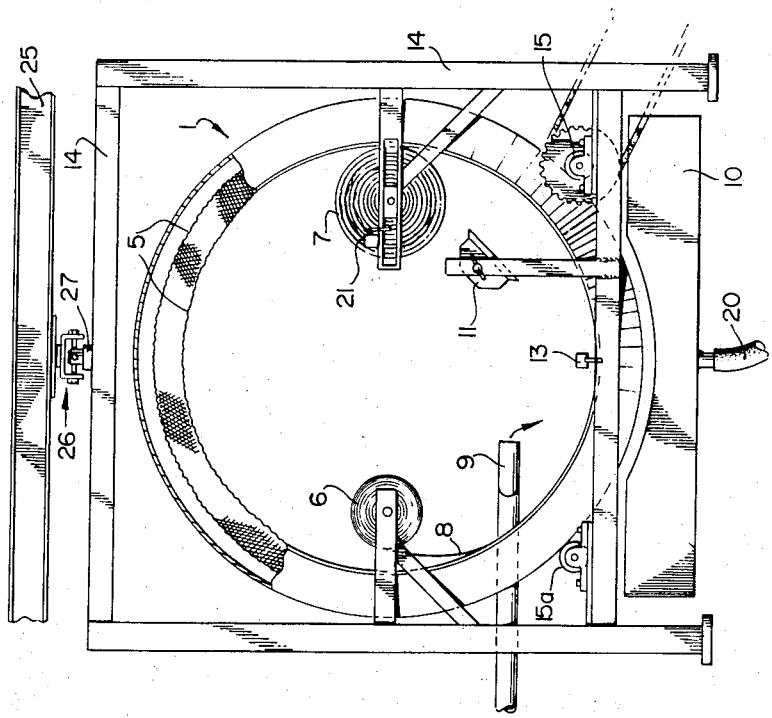

LIQUID FILTER

This invention relates generally to apparatus for filtering liquids containing solid particles, and is particularly suited for use with sewage.

In copending Canadian Pat. application Ser. No. 066,122, filed Oct. 29, 1969, there is disclosed sewage treatment apparatus. The steps in the treatment include aeration of raw sewage in a holding tank, and subsequent blending with a flocculating and coagulating agent. The mixture then is passed to filtering or clarifying apparatus provided with a filter medium which removes solids therefrom, after which the filtrate may be subjected to further treatment.

The present invention finds useful application as a clarifier device in operation with sewage treatment equipment such as that described in Canadian Pat. application; No. 066,122 aforesaid. It will, however, be apparent that it can be used in other applications where separation of solids from a liquid is desired and in areas other than sewage treatment.

In the sewage treatment apparatus disclosed in copending U.S. Pat. application Ser. No. 066,122, there is described a clarifier device including a filter media which can be periodically moved across the bed of the clarifier and wherein the bed forms a filtrate reservoir within the clarifier device. Canadian Pat. No. 503,081 and 511,369 also disclose liquid filtering devices which move a filter media across a generally horizontal reservoir. The filter media containing the separated solids is taken up at one end of the clarifier for disposal or reclamation of the solids. The filtrate collected in a pan beneath the media may be discharged as is, recycled, or subjected to further treatment.

According to the present invention, liquid filtration apparatus comprises a drum mounted for rotation about a horizontal axis, means for feeding a strip of filter material in the direction of rotation of the drum onto a lowermost region of the interior of the drum, a liquid outlet for discharging onto the filter material in the lowermost region a liquid to be filtered, and an outlet for discharge of filtered liquid from the drum.

Although the filter apparatus is described with reference to sewage treatment equipment, the advantages in its use may be realized in other cases it is desired to separate solids in suspension in a liquid from that liquid, such as in the filtering of fruit and vegetable juices, the cleaning and reclaiming of cooling and cutting lubricants and the like.

An embodiment of the present invention now will be described by way of example with reference to the accompanying drawings, in which:

FIG. 2 is an end view in detail of the apparatus shown in FIG. 1; and

FIG. 3 is a side view in detail of the apparatus shown in FIGS. 1 and 2.

Figure 1:
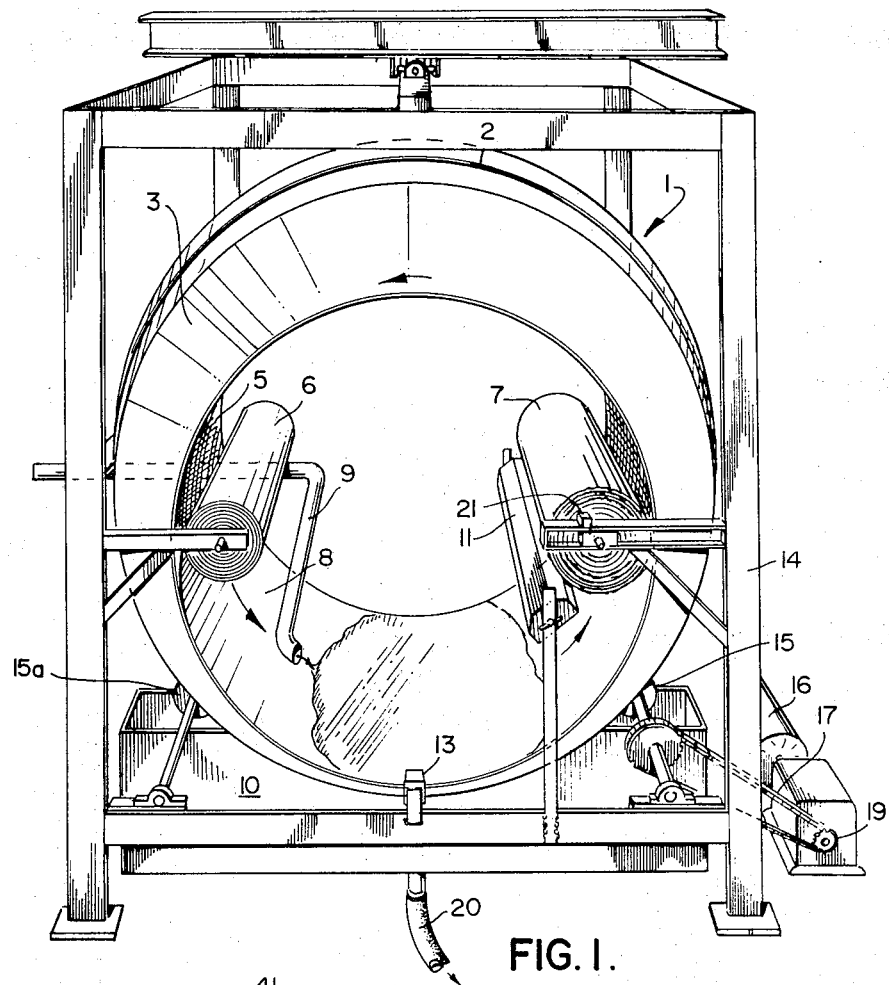
FIG. 1 is a perspective view illustrating a liquid filter apparatus embodying the present invention.

Referring now to the accompanying drawings, a clarifier drum 1 is formed of two mirror-image halves which are bolted or otherwise fastened together leaving an opening in the form of a discharge slot 2 between the two halves. The drum may be formed of any suitable rigid material which will not be subject to deterioration or corrosion from the liquids being filtered, such as a plastic resin impregnated with fiberglass material. The drum is shaped such that the outer edges of each half are smaller in diameter than the inner portions adjacent to the discharge slot, thereby providing a drum wall having a concave inner surface and sloped shoulders 3 which serve to retain the pool of liquid to be filtered within the confines of the drum. The central portions of each drum half serve to support the drum upon its drive rollers and provide adequate capacity for the pool of liquid being filtered.

The inside of drum 1 is provided with a filter spacer arrangement comprising a perforated inner screen 5 which extends completely around the interior thereof and continuously from one side across the discharge slit to the other side. A strip of filter material 8 is supported by the screen 5 at a spacing from the wall of the drum, and which is dispensed from a supply roller 6 and taken up by a take-up roller 7. The liquid to be filtered is fed from a feed conduit 9 onto the filter material 8 supported at the lowermost region of the drum by the screen 5. Due to the shape of the drum 1, the liquid forms a pool on the filter material at this region of the drum. The liquid percolates through the filter material 8, passes through screen 5, and discharges through slot 2 into a collection tray 10 located beneath slot 2 on the underside of the drum.

The solids are trapped by the filter material 8. As the solids build up, the drum is rotated a short distance at pre-set time intervals, thus moving the filter material along. The impregnated filter material passes under a dryer 11 before being wound onto take-up roll 7 in dry condition, with the separated solids in a dry, inert and inactive state. Although drying of the filter media and separated solids is preferred when the filter apparatus of this invention is utilized as part of a sewage treatment unit, the heater is not an essential part of the invention and may be omitted when not required or not desired. The effluent in collection tray 10 can be discharged, recycled, or subjected to further treatment such as chlorination if desired.

The shape of drum 1 with shoulders 3 provides a basin at the bottom of the drum which retains a pool of liquid and suspended solids delivered to the filter apparatus from feed conduit 9. The pool is retained on top of the filter material 8, and as it percolates through the filter material it passes through the screen 5 onto the inner surface of drum 1. The taper at the edges of the drum causes any fluid passing through the screen to run to the centre of the drum where it falls through slot 2 between the drum halves. Normally the collection tray 10 is placed beneath the slot to catch any fluid draining therethrough and direct it to drain 20, but the tray may be eliminated, if not required for a particular application, or may be replaced with other equipment for discharge of the effluent.

The filter material 8 unrolls off a dispensing roll 6 onto the inner screen 5 of drum 1. The filter material may e.g. be a straining cloth or a filter paper. Cloth usually is more expensive. It is also difficult and time-consuming to dry and clean cloth so that it can be used again. For these reasons it generally has been found preferable to utilize a disposable filter paper as the filtering media. The filter paper collects the solids, is dried, wound-up on the take-up roll, and then disposed of in any convenient manner.

The supply roll 6, containing the filter material is mounted inside the drum in such a manner that the filter material unrolls onto inner screen 5 as the drum rotates. Although in certain installations it may be desirable to make the position of roll 6 adjustable relative to the wall of the drum to allow for decreasing diameter as it unrolls, it has been found in practice that this is not absolutely necessary. The diameter of the supply roll, which is tightly wound and dry, is small relative to that of the take-up roll, and may be permanently placed in close proximity to the inner screen so as to function efficiently and yet sufficient distance away to hold a full roll of filter material. The presence of the pool of sludge in the bottom of the drum has been found effective to hold the paper down against the screen and to unroll the dispensing roll in response to rotation of the drum and associated screen.

Prior to being wound onto the take-up roll, the filter material passes under a dehumidifying heater 11. The presence of a heater has been found advantageous when this liquid filter apparatus is applied to the purification of sewage; the sludge and filter media being dried before being wound onto the take-up roll. The drying of the filter material and sludge allows the collected roll to be wound tighter on the take-up roll, and reduces its weight considerably since the moisture has been removed. In addition, the drying of the sludge in the case of sewage, reduces its activity and concomitant odor, and makes the used roll easier to dispose of by incineration or other means.

The heater 11 which may be associated with the filter apparatus preferably is of the radiant heat type. A standard electrical radiant heater having a reflector has been found quite practicable. The passage of electrical energy through the longitudinal resistance rod produces sufficient heat to dry the sludge and filter material without scorching or burning, and this type of heater can be easily controlled by varying the strength of the electrical current or by application of the current for intermittent periods.

The drum 1 and associated inner screen 5 are rigidly fastened together and rotate as a unit. The drum may be rotated slowly at a constant speed. However, it has been found adequate to periodically rotate the drum a set distance, depending upon the rate of inflow of liquid and the ability of the filter media to pass the fluid. Movement of the drum can be activated in response to a float and limit switch sensing the level of the liquid in the bottom of the drum, i.e., when the level of the pool reaches a certain height the float contacts a switch which activates rotation of the drum to move new filter media onto the screen bed. However, in applications wherein the rate of fluid inflow from feed conduit 9 is relatively constant, it is much simpler to periodically rotate the drum a set distance each time. The distance through which the drum rotates and the frequency of rotation can be set to take care of the rate of inflow. A repeating cycle timer of the cam type has been found suitable for control of the frequency of rotation cycles and the duration of each cycle. The frequency and duration can be readily adjusted to match the rate of inflow and the solids content of the liquid to be clarified.

The weight of the liquid and solids in the basin of the drum presses the filter material onto the screen and unrolls the filter material from the dispensing roll as the drum rotates. On the other hand, the take-up roll requires a drive system to rotate and wind up the dried filter material and collected sludge. It is preferred to mount the take-up roll on a roller which slides within a slot on the drum framework which is on a radius of the drum, and is spring-biased toward the inside screen surface of the drum. The spring tension holds the take-up roll against the inside wall of the drum, and the roll is rotated by the rotation of the drum whenever it is rotated. This rotational drive for the take-up roll has the advantage that, as the pick-up roll increases in diameter, the rate of rotation of the circumference of the roll remains constant and equivalent to the drum rotation. This removes the problem of providing the take-up roller with a proportional drive mechanism, such as might be required if it had a separate drive mechanism. In this preferred manner, the rotation of the pick-up roll is always equivalent to the rate of movement of the filter media inhibiting tension or looseness in the media resulting from unequal speeds of rotation in the rolls.

Although it has been found unnecessary to utilize a float and limit switch to control drum rotation, it is advisable to equip the filter apparatus with an overflow and underflow alarm float and limit switch 13. In this way, if the sludge in the basin rises above a certain level (due to malfunction, for example, of the drum rotation mechanism) or falls below a predetermined level (as a result of, for example, shut down of the inflow) an alarm can be activated by the closing of the limit switch, and the complete system can be shut down.

The drum 1 is supported within a framework 14 on two sets of rollers 15 and 15A. The drum rests upon the rollers, and one set of rollers 15 acts as a drive mechanism to rotate the drum, while the second set 15A acts as idler rollers to support the drum for rotation. In the embodiment illustrated, the framework 14 surrounds the drum, and an electric motor 16 driving through drive belts or chains 17 and reducing sprocket 19 rotates rollers 15 and thus drum 1.

The shoulders 3 of drum 1 have a pronounced angle so as to create a basin for holding the liquid in the bottom of the drum. The portion of the drum from the inner edge of the shoulders 3 to the slit 2 also has a slight taper, with a corresponding taper on supporting and driving rollers 15 and 15A. This tapering of the shell of the drum and of the rollers has two advantages; the liquid draining through screen 5 onto the outer shell of drum 1 is urged toward slot 2, and in addition, the drum is constrained from sliding back and forth on the rollers and thus remains centred within the framework and above collection tray 10.

The illustrated embodiment utilizes a screen 5 supported within drum 1. The liquid draining through the screen is collected by the outer shell of drum 1 and drains through slot 2. In view of the use of slot 2 to collect the clarified fluid, only a relatively narrow collection trough 10 is required. In an alternative embodiment, the drum 1 can itself be perforated, e.g. in the form of a screen provided with sufficient structural strengthening to remain rigid and keep its drum shape. In such an embodiment the fluid draining through the filter medium 8 and screen forming the drum will require a collection tray large enough to cover the total area beneath the basin formed within the screen. In some applications, it may be desirable to utilize a full-size collection tray in any case, even though a drum with a narrow central slit is utilized to collect the filtered liquid.

It is desirable to provide the liquid filter apparatus with an enclosure, particularly when utilized as part of sewage treatment equipment. The frame 14, in addition to providing support for the drum and its associated equipment, provides structure to which walls and a cover can be releasably fastened to enclose the apparatus. If the liquid filter apparatus is to be installed on a solid foundation, the frame 14 can be anchored to that foundation.

The apparatus of this invention has found particularly advantageous application as part of an on board ship sewage treatment installation. In such an installation, the supporting frame 14 is suspended from an overhead beam 25 utilizing a universal joint 26 connecting a cross-beam 27 fixed to the supporting frame 14 to the overhead beam 23. The universal joint 26 permits the filter apparatus to swing with the motion of the ship and stay relatively level; this reduces sloshing and spillage of the fluid in the bottom of the drum, as it is able to swing independent of the ship's motion.

As mentioned previously, the filter apparatus preferably is equipped with an alarm float and limit switch 13. In addition, it is desirable to equip the take-up roller with a switch 21 which activates an indicator or alarm mechanism in response to the take-up roll moving against spring-tension to its full position, farthest from the inside of the drum. The slot which permits sliding movement of the pick-up roller is designed so that it will hold one full roll of filter media plus caked sludge. The filter media as a result of being wetted tends to stretch and in addition the solids built up on the media are also wound onto the take-up roll. It has been found that a full roll of filter media on the take-up roller has a diameter about several times that of a new fresh roll. When the pick-up reaches a position where it can move no further away from the drum, switch 21 activates an alarm indicating the take-up roll has reached maximum capacity.

Alarm float and limit switch 13 are included in the apparatus to not only warn when the inflow has slowed or stopped, but also to indicate the possible situation in which the filter media has broken or the supply has run out and as a result there is no media in the basin within the drum. Without filter media under the pool in the bottom of drum 1, the liquid and suspended solids very quickly drain through the screen 5. The pool empties and the drops, activating the limit switch 13 which indicates alarm and/or shuts down the system including the inflow to the filter apparatus.

The mounting of heater 11 preferably is adjustable so that it may be moved further away from or closer to the inside surface of the drum, as required. In addition, the amount of heat radiated by the heater can be altered by controlling the amount of current passing through it. Alternatively, it has been found that a repeating cycle timer is less expensive and satisfactory. The heating element retains residual heat after being turned off and repeated cycling of the current can be utilized to reduce the amount of heat produced by the heating element without causing undesirable unevenness of drying of the filter media and collected sludge. It is possible, of course, to have a heater other than electric (i.e., a natural gas burner) or to omit the heater from the apparatus if desired, without departing from the spirit or scope of this invention.

Figure 4:
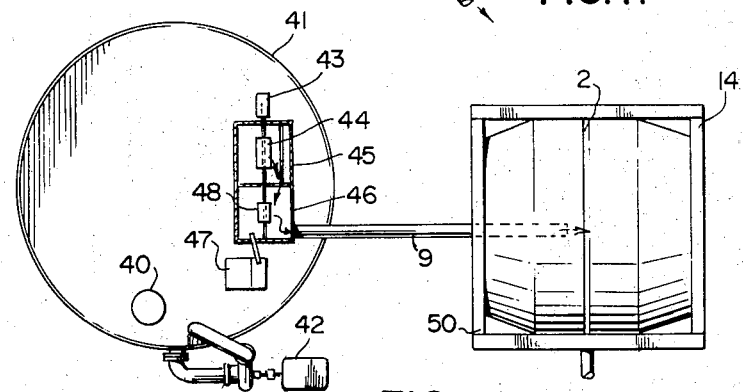
FIG. 4 is a top schematic view of a sewage treatment unit incorporating the liquid filter apparatus of this invention and illustrated in FIGS. 1 to 3.

With reference to FIG. 4, there is shown a top view of the liquid filter apparatus of FIGS. 1 to 3 set up to operate as part of a sewage treatment unit similar to that described in copending U.S. Pat. application Ser. No. 066,122. Reference numeral 41 indicates a holding tank which receives the raw sewage prior to treatment. The sewage enters the tank through inlet 40 and runs down over a series of baffles (as more fully described in the aforesaid pending application) which aerates the sewage as it runs into the tank. Pump 42 constantly circulates the sewage from the bottom of tank 41 to the top where it drops down over the baffles again. The pump also serves as a macerating unit in that the impellers break up the solids as the sewage is being circulated. The sewage is being circulated constantly and thus continuously aerated by the operation of pump 42. It is advisable to utilize a pump in which the impellers are easily and quickly accessible in case they become clogged. In some installations, a second pump operating in parallel to pump 42 is desirable or required by regulations.

A motor 43 drives a cup belt conveyor 44 which descends to the bottom of tank 41. The conveyor 44 runs at constant speed, lifting and delivering a steady flow of macerated and aerated sludge which falls from the conveyor cups into a trough 45 and thence to a coagulant addition tank 46. This is a small tank usually (but not necessarily) situated above main holding tank 41. A pump 47 delivers a metered flow of flocculant or coagulant substance to mixing tank 46. It is advantageous to place tank 46 adjacent conveyor 44, since the conveyor drive motor 43 can then also be used to operate a mixing paddle 48 to stir the coagulant into the sewage.

The aerated and macerated sewage with coagulant blended therein then flows by gravity via feed pipe 9 to the liquid filter apparatus of this invention indicated generally by reference numeral 50. Holding tank 41 evens out surges and fluctuations in the inflow of sewage to the treatment unit, and the operation of cup conveyor 44 and mixing tank 46 serves to provide a relatively constant feed of liquid and suspended solids to the liquid filter apparatus.

The sewage treatment unit illustrated in FIG. 4 can have the various components thereof rearranged to fit into different spaces, which can be important in shipboard installations where there is normally a shortage of space. It is also possible to physically separate the parts of the apparatus from each other, if desired. For example the holding and aerating tank 41 could be placed some distance from the clarifier apparatus 50.

The liquid filtering apparatus taught herein is clearly one which solves a definite need in the field of sewage treatment. It will also facilitate solutions to liquid sewage treatment problems presently in public review with respect to pollution control. The invention accordingly represents a useful advance in the art.

I claim:

1. Liquid filtration apparatus, comprising:
    a. a drum;
    b. means mounting said drum for rotation about a horizontal axis;
    c. means for feeding a strip of filter material in the direction of rotation of said drum onto a lowermost region of the interior of said drum;
    d. means defining a liquid outlet for discharging onto the filter material in said lowermost region a liquid to be filtered; and e. means defining an outlet for discharge of filtered liquid from said drum.

2. Liquid filtration apparatus as claimed in claim 1, wherein said outlet is formed in the wall of said drum.

3. Liquid filtration apparatus as claimed in claim 2, wherein said outlet extends around substantially the whole of the periphery of said drum.

4. Liquid filtration apparatus as claimed in claim 1, wherein said drum has a wall having a concave inner surface.

5. Liquid filtration apparatus as claimed in claim 1, further comprising a spacer arrangement for spacing the filter material from the wall of said drum.

6. Liquid filtration apparatus as claimed in claim 5, wherein said spacer arrangement comprises a screen extending around the interior of said drum.

7. Liquid filtration apparatus as claimed in claim 1, wherein said filter material feed means comprise a supply roll and a take-up roll.

8. Liquid filtration apparatus as claimed in claim 7, wherein said take-up roll is spring-biased into a position in which said take-up roll is rotated by said drum during rotation of said drum.

9. Liquid filtration apparatus as claimed in claim 1, further comprising a heater for heating residue on the filter material, said heater being disposed beyond said lowermost region in the direction of rotation of said drum.

10. Liquid filtration apparatus as claimed in claim 1, further comprising a universal joint for suspending said apparatus.

11. Liquid filtration apparatus as claimed in claim 1, further comprising drive means for rotating said drum and sensing means responsive to the level of liquid on the filter paper at said lowermost region for controlling said drive means.

12. Liquid filtration apparatus as claimed in claim 3, wherein said drum has a wall having a concave inner surface, and further comprising a spacer arrangement for spacing the filter material from said drum wall, said spacer arrangement comprising a screen extending around the interior of said drum.

13. Liquid filtration apparatus as claimed in claim 12, wherein said filter material feed means comprise a supply roll and a take-up roll and said take-up roll is spring-biased into a position in which said take-up roll is rotated by said drum during rotation of said drum.

14. Liquid filtration apparatus as claimed in claim 13, further comprising a heater for heating residue on the filter material, said heater being disposed beyond said lowermost region in the direction of rotation of said drum.

* * * * *